United States Patent

Bhatt

Patent Number: 5,101,593
Date of Patent: Apr. 7, 1992

[54] PORTABLE GREENHOUSE WORKING ON SOLAR SYSTEM

[76] Inventor: Kashyap K. B. Bhatt, 711 Finch Avenue West, Apt. 103, Toronto, Ontario, Canada, M3H 4X6

[21] Appl. No.: 496,629

[22] Filed: Mar. 7, 1990

Related U.S. Application Data

[63] Continuation-in-part of Ser. No. 280,453, Dec. 6, 1988.

[51] Int. Cl.$^5$ ............................................. A01G 9/00
[52] U.S. Cl. ........................................ 47/17; 47/61; 47/62
[58] Field of Search ................................. 47/17, 61, 62

[56] References Cited

U.S. PATENT DOCUMENTS

| | | | |
|---|---|---|---|
| 1,504,721 | 8/1924 | Sauvé | 47/17 |
| 2,896,374 | 7/1959 | Perin | 47/61 |
| 2,928,211 | 3/1960 | Martin | 47/61 |
| 2,952,096 | 9/1960 | Hughes | 47/61 |
| 4,141,498 | 2/1979 | Marschner | 47/17 |
| 4,196,544 | 4/1980 | Davis | 47/17 |
| 4,198,953 | 4/1980 | Power | 126/428 |
| 4,248,209 | 2/1981 | Wasserman | 47/17 |
| 4,470,405 | 9/1984 | Landstrom | 47/17 |
| 4,567,690 | 2/1986 | Marrell | 47/17 |
| 4,567,732 | 2/1986 | Landstrom | 47/17 |
| 4,583,321 | 4/1986 | Stanhope | 47/17 |

*Primary Examiner*—Henry E. Raduazo
*Attorney, Agent, or Firm*—Kenneth M. Garrett

[57] ABSTRACT

A solar greenhouse includes walls and a roof which together with a floor form a closed chamber. Windows are provided to permit the entry of light into a major part of the chamber where growth will occur while restricting light to a minor portion thereof where germination of seeds occurs. Racks for stacked growing trays are provided; preferably the upper part of the chamber is used for germination. The greenhouse further includes apparatus for accumulating solar energy in the form of electrical energy so as to drive irrigation pumps and fans and also in the form of thermal energy to assist in maintaining desired temperatures in the chamber.

17 Claims, 4 Drawing Sheets

1

PORTABLE GREENHOUSE WORKING ON SOLAR SYSTEM

CROSS REFERENCE TO RELATED APPLICATION

This application is a continuation-in-part of U.S. patent application Ser. No. 280,453 filed Dec. 6, 1988.

FIELD OF INVENTION

This invention relates to improved, generally solar energy sustainable greenhouse particularly suited for the growth of fodder or the like.

BACKGROUND OF INVENTION

Many developing countries are characterized by an abundance of sunshine, a lack of rainfall, and particularly in rural districts, the absence of electrical energy. The present invention seeks to provide a low cost, high efficiency growth environment which minimizes the need for irrigation water and external power sources. It further seeks to provide structures that are easily erectable, and which may be totally prefabricated and knocked-down for shipping purposes, or which are partially prefabricated for erection using simple, locally available framing materials, for example, although the broad concept of the invention is also applicable to on-site construction, which may be preferable for larger structures.

In growing fodder crops such as maize and barley or the like, the growth cycle may be completed under optimum conditions within about seven days. Of this period some two days comprises the germination period, and is best carried out under dark or subdued light conditions, and about four days comprises a high growth period, which is best carried out at high ambient light levels. The seventh day of the cycle includes such operations as seed preparation and collection of the fodder, which may usually be effected outside of the greenhouse.

One of the problems encountered with the growth of crops indoors is that of heat prostration. Depending on the intensity of the heat within the greenhouse this may be countered by natural ventilation or forced ventilation, but at extreme levels it is required to remove heat by refrigeration.

SUMMARY OF THE INVENTION

In accordance with my invention, the greenhouse comprises wall means including roof means which when erected on a floor surface will form together therewith a closed chamber. Windows are provided in the wall means, the windows locating to diminish the entry of light to a minor part of the chamber best suite for germination, and to permit high lighting levels in the major part of the chamber to promote growth. Since the weight of the crop increases enormously over the growth cycle, it is preferred that the lower part of the chamber, generally about the lower two-thirds thereof, will be brightly illuminated, with the upper part maintained under subdued lighting conditions. Rack means which is mounted from the floor extends upwardly into the upper portion of the chamber. Generally speaking the upper one third of the rack means will be in the subdued lighting portion of the chamber and will support trays of seeds when germinating, and the lower two-thirds of the rack means will be illuminated to support trays of seeds in the growth cycle of the crop.

Irrigation means is supported from the rack means for supplying water and nutrients to the plants and any growth medium contained in the trays.

The greenhouse further comprises means for accumulating energy. Such energy is in the form of electrical energy which is accumulated in battery means charged by photo-voltaic cells mounted on the chamber, and also thermal energy, which is accumulated in a tank containing a liquid which may be heated or cooled depending upon whether there will be a temperature excess or deficit in the chamber. For the purpose of this description, the accumulation of water at a temperature of less than the ambient temperature is considered to accumulate thermal energy. In accordance with a preferred embodiment, where a temperature excess will be encountered, the thermal energy accumulating means comprises refrigeration means for cooling the liquid contained in the tank, which cooled liquid may be used for cooling the atmosphere within the chamber.

The greenhouse may further comprise a fan means for inducing a flow of air into the chamber. Suitably the chamber will be provided with one or more openings for exhausting the air. In accordance with the preferred embodiment ones of the windows locating in the wall opposed to the fan means are louvred to control the exit of air from the chamber, and thereby the temperature therein when moderate temperature excesses are experienced. Where more severe temperature variations from that which is desirable are likely to be encountered, a heat exchanger connected in thermal flow relationship is placed in the air stream from the fan means. Suitably the liquid in the thermal energy accumulator is water, and the heat exchanger may comprise a porous screen over which the energized water is trickled.

Desirably wherever a temperature excess or deficit is likely to be encountered, the wall means and the roof means will include thermal insulation therein to restrict the passage of heat therethrough. The solar panel means may be spaced above the roof proper of the structure, so as to provide an air space therebetween. The glazing material of the windows will also be desirably selected to maximize light transfer and reduce thermal transfer and for this purpose a double skinned clear polycarbonate or polyacrylate glazing is preferred.

These foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
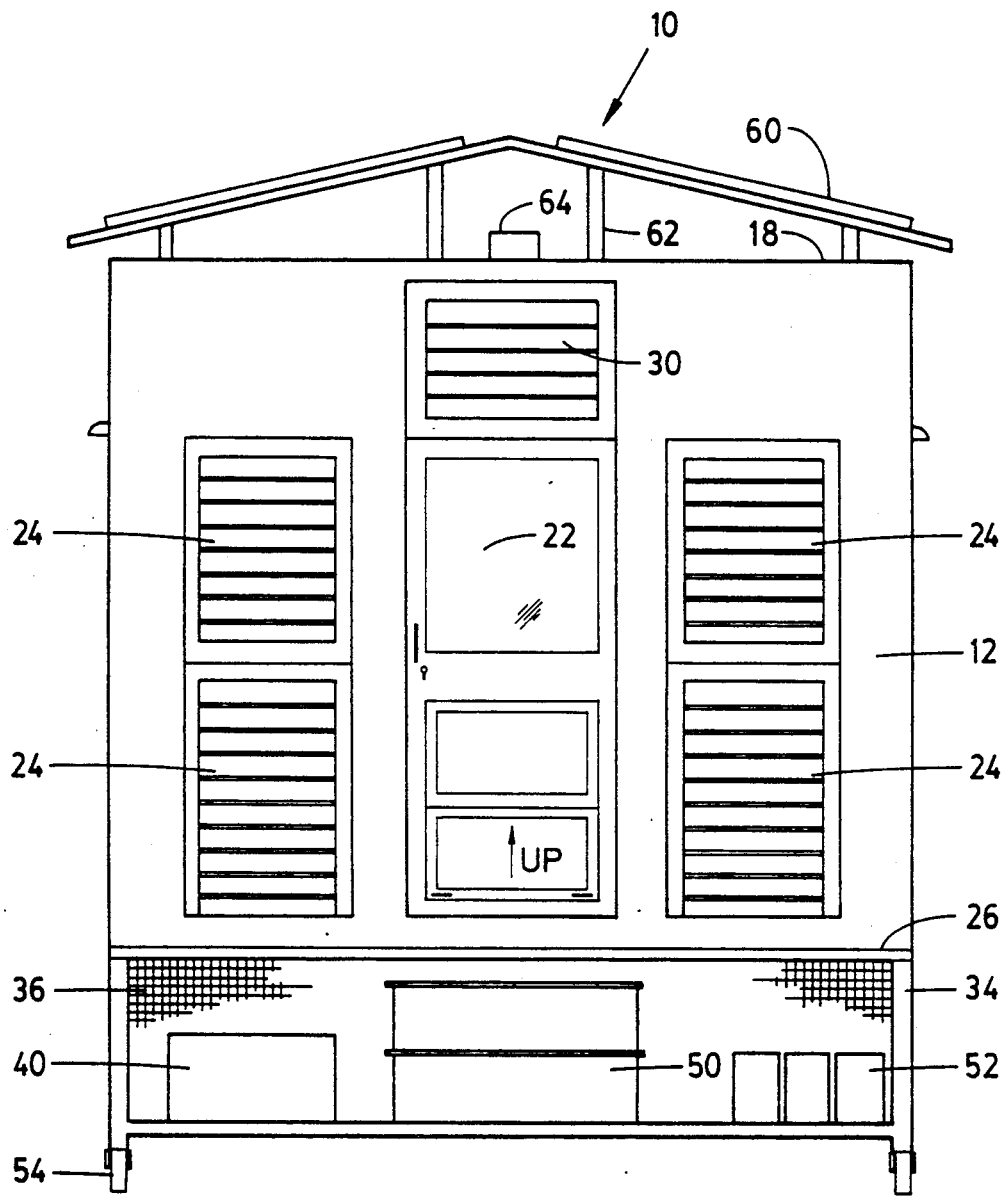
FIG. 1-is a front elevation of the greenhouse of the invention.
Figure 2:
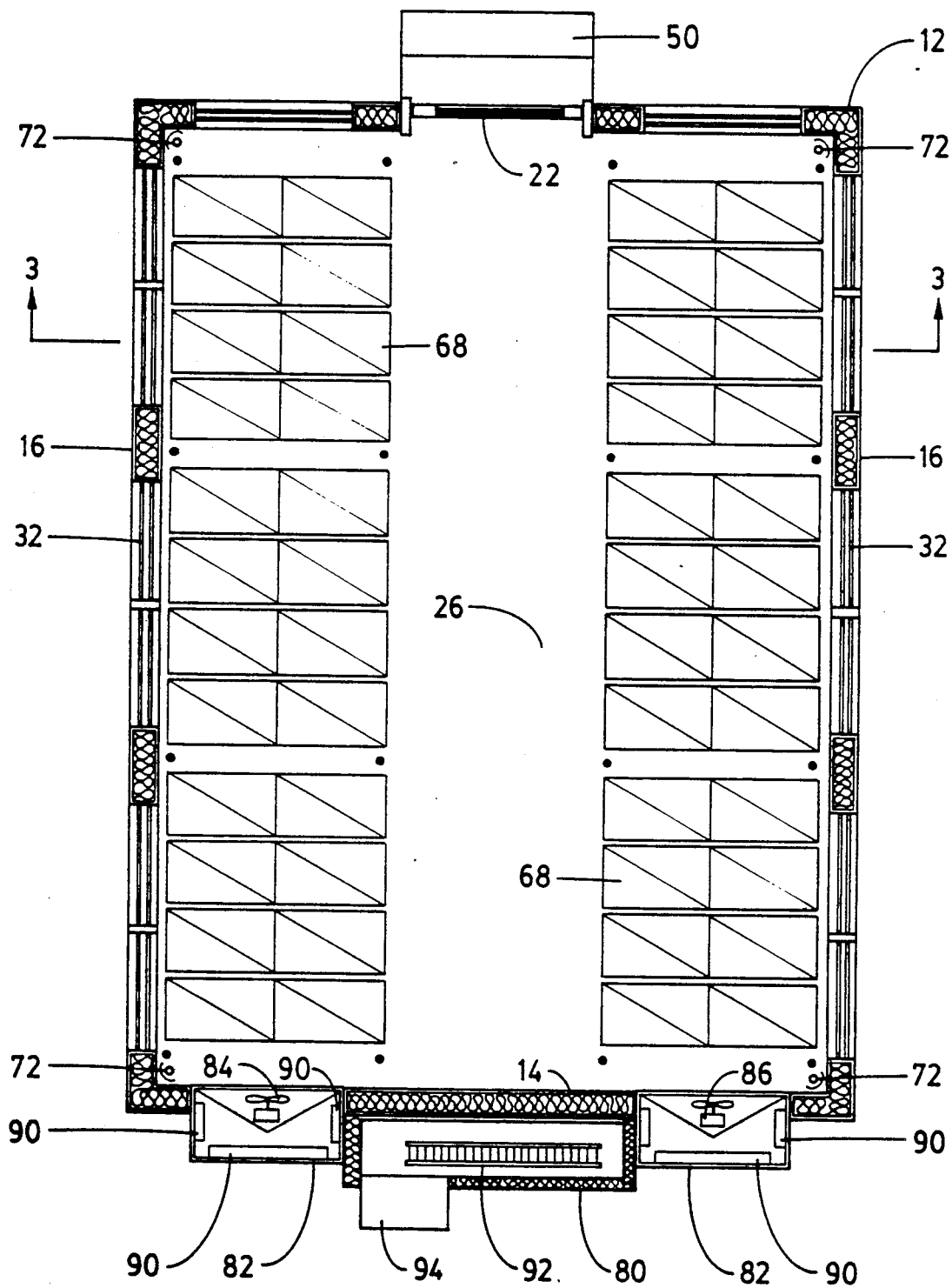
FIG. 2-is a plan view in mid-horizontal section of the greenhouse of FIG. 1.

Referring to the drawings in detail, a greenhouse according to the invention is identified generally therein by the numeral 10.

Greenhouse 10 comprises a front end wall 12, rear end wall 14 interconnected by side walls 16 and spanned by a roof 18. The front end wall 12 is provided centrally therein with a door 22 and on each side thereof with adjustable, louvred windows 24 which extend from adjacent the floor 26 upwardly to about two-thirds the vertical height of wall 12. An opaque louvre 30 locates above door 22.

Each side wall 16 is provided with fixed windows 32 therealong having a vertical dimension similar to that of front windows 24. Windows 24 and 32 are formed of two skins of clear polycarbonate material having an air gap therebetween and held in spaced apart relationship by internal ribs (not shown).

Greenhouse 10 is mounted from a ground surface by a base 34 which is a generally an open structure suitably enclosed by wire mesh 36. Within base 34 there is mounted a water reservoir 40, an irrigation pump 42 and conduit 44, and a drainage conduit and a sludge separator (not shown).

Also contained within base 34 there are a plurality of heavy duty rechargeable electrical storage batteries 52. Steps 50 are provided on base 34 leading to door 22, and the base may be supported on wheels 54 where it is desired to move greenhouse 10.

Roof 18 and walls 12, 14, 16 are all double skinned, having an air gap therebetween filled with insulating material 56 and are all easily prefabricated and shipped for on-site assembly. Preferably the interior skin of the walls and roof comprises a smooth soil repellent material such as sheet polypropylene that is easily washable and disinfectable periodically.

Photo-voltaic panels 60 are mounted on roof 18 in spaced apart relationship therefrom by stilts 62 the height of which is adjustable so as to permit panels 60 to be oriented for best efficiency. A plurality of openings 64 are provided in roof 18 to exhaust into the space between the solar panels 60 and the roof.

A plurality of racks 66 are provided within greenhouse 10 along each side thereof. Racks 66 extend to adjacent roof 18, and are structured to support a plurality of trays 68 in stacked relation therein, and permit the trays 68 to be more widely vertically separated on approach to the bottom end of the racks, to accommodate increased growth of the plants therein. Racks 66 support spray heads 70 over each tray 68, which spray heads are connected in flow relation with irrigation conduit 44. Racks 66 are slightly angulated to facilitate drainage of any excess water therefrom, which drainage water is collected by a drainage tube (not shown) and returned to water reservoir 40 by way of a sludge separator (not shown). Fluorescent discharge lamps 72 are provided within greenhouse 10 for supplementing the lighting level.

On the rear wall 14 of greenhouse 10 there is mounted a thermal storage tank 80 and a fan housing 82 on each lateral side thereof. Each fan housing 82 contains a fan 84 and a motor 86 therefor operable by storage batteries 52. The external vertical sides of fan housings 82 are louvred at 88 to permit the flow of air therethrough, and each such louvre 88 has a permeable screen 90 associated therewith. Thermal storage tank 80 contains water therein, and the evaporator coil 92 of a refrigeration unit 94 which is operable by storage batteries 52. Water from storage tank 80 is trickled over screens 90 which thereby function as heat exchangers to cool or warm the air passing over them on the operation of fans 84.

Figure 3:
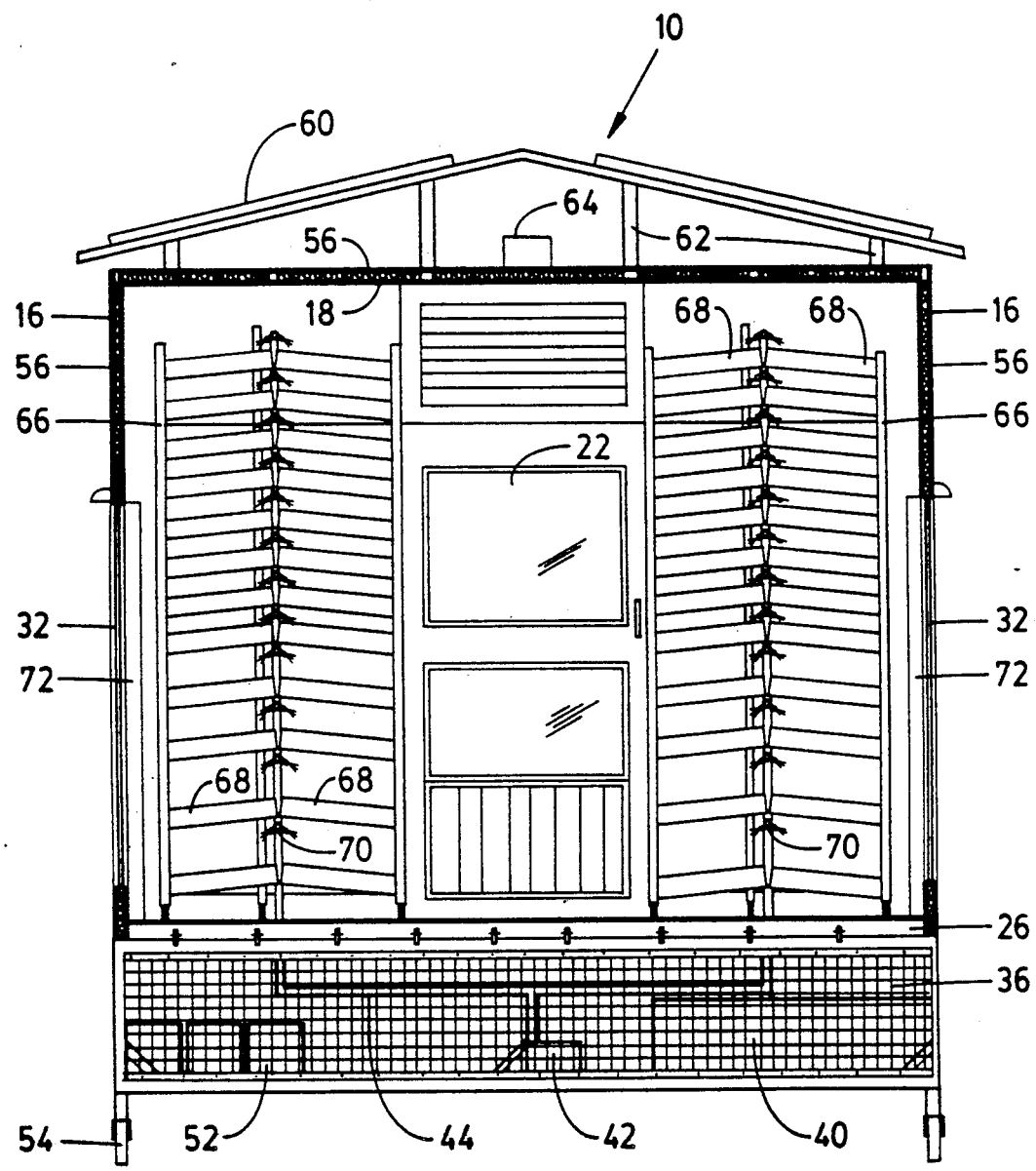
FIG. 3-is an elevational view on line 3—3 of FIG. 2.
Figure 4:
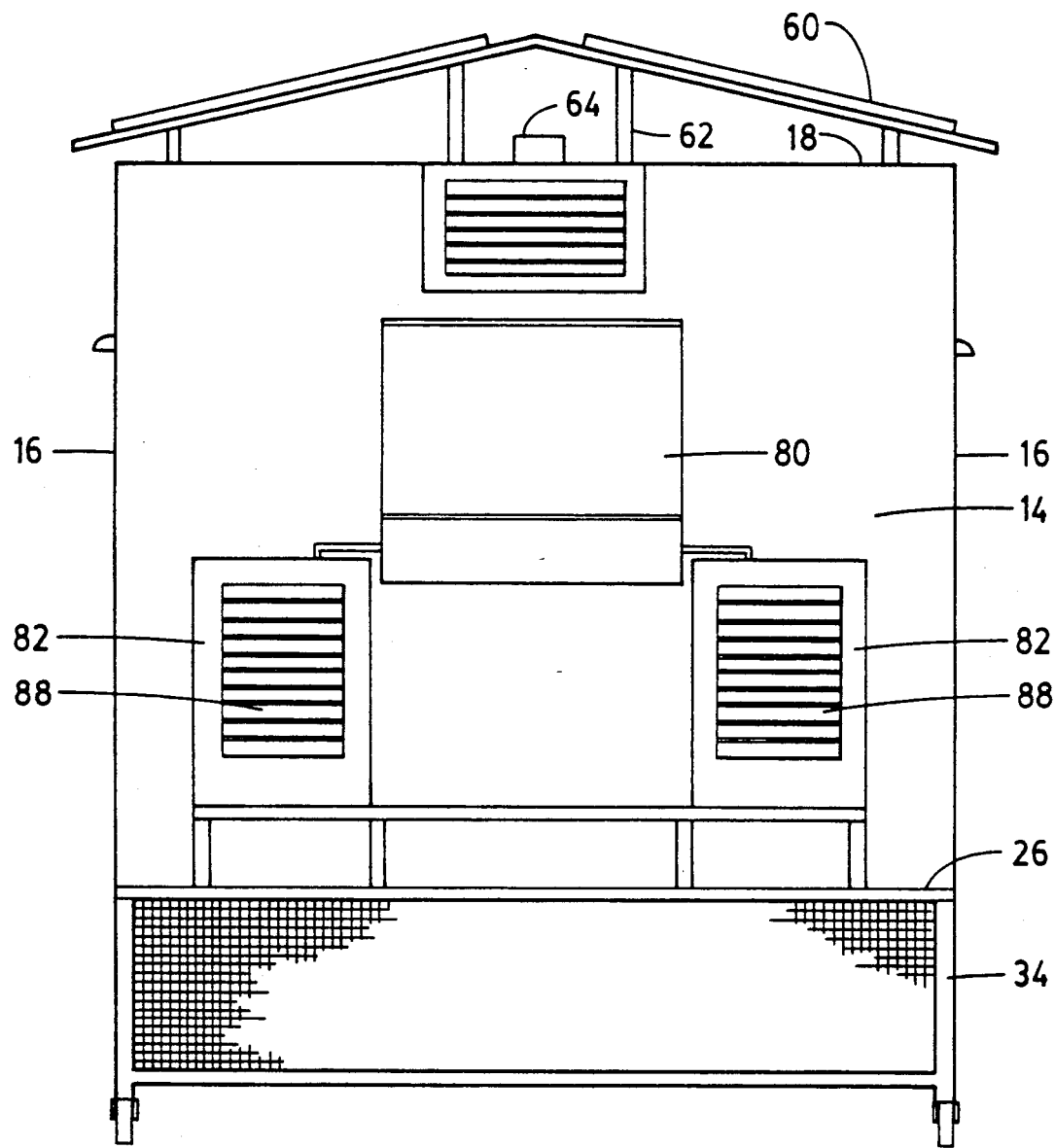
FIG. 4-is a rear elevational view.

Operation of the improved greenhouse 10 is very simple. Seeds are pre-soaked, optionally using germination accelerators as are generally known in the art, and seeds are planted in trays 68, which may contain a mulch compatible with hydroponic culture, preferably one which is cellulosic whereby it may itself provide some nutritive value to livestock where fodder is being cultivated. Newly planted trays 68 are stored in the uppermost position in racks 66. The following day these trays are moved downwardly one slot, and the vacant uppermost position is taken by the next planting and so on until racks 66 are filled. As illustrated in FIG. 3 each rack 66 has twelve vertical slots, and the trays 68 are moved downwardly two at a time. The trays 68 are irrigated with water from reservoir 40, to which a nutrient solution will normally be added. Each day, once rack 66 is filled, two trays 68 are removed ready for use. The facilitate their removal, the lower part of windows 24 and of door 22 are upwardly slidable. It is found that in this matter a daily production of fodder of not less than about 50 kg/m$^2$ of floor space is easily sustainable using as little water for irrigation purposes as 2 l/kg of fodder.

Although not shown, the temperature control of greenhouse 10 is easily automated using readily available thermostatic controls. While the energy requirements of greenhouse 10 are wholly sustainable under favourable climatic conditions, it may be easily supplemented by other energy sources commonly available in a rural environment such as anaerobic fermentation, wind powered generators and water powered generators. However, where more conventional energy sources are available these may be preferred.

The above description is to understand the invention and in no way to limit the scope of invention which is susceptible to various improvements and modifications within the ambit and scope of present invention which will be evident to those skilled in the art.

I claim:

1. A solar greenhouse comprising
    wall means including a roof, a floor, walls interconnecting said roof and floor so as to form a closed chamber;
    said chamber having an upper minor portion and a lower, major portion;
    window means disposed in at least one side wall forming said lower portion of said chamber to provide a generally higher level of natural lighting in said lower portion than in said upper portion;
    solar energy accumulating means comprising electrical energy accumulating means including rechargeable battery means and photo-voltaic cell means interconnected therewith, and thermal energy accumulating means;
    means associated with said energy accumulating means for controlling the temperature within said chamber,
    and rack means adjacent said at least one side wall for supporting a plurality of growing trays one above the other extending from said lower portion of said chamber into said upper portion thereof.

2. A solar greenhouse as defined in claim 1, wherein said window means includes clear double skinned polycarbonate sheet having an air gap between said skins.

3. A solar greenhouse as defined in claim 1, wherein said thermal energy accumulator means includes refrigeration means.

4. A solar greenhouse as defined in claim 3, wherein said thermal energy accumulating means includes a water tank for storing water cooled by said refrigeration means.

5. A solar greenhouse as defined in claim 1 further comprising fan means for inducing a flow of air into said chamber.

6. A solar greenhouse as defined in claim 5, wherein said temperature controlling means includes heat exchange means connected in thermal relationship with said thermal energy accumulating means, said heat exchange means locating in a position such that said flow of induced air passes thereover.

7. A solar greenhouse as defined in claim 6, wherein said heat exchange means comprises a porous screen over which said cooled water is trickled.

8. A solar greenhouse as defined in claim 5, wherein at least ones of said window means are louvred to permit the exhaustion of air from said chamber.

9. A solar greenhouse as defined in claim 8, wherein said fan means in mounted on a lower portion of said wall means generally opposed to said louvred window means to provide a cross flow of air through said chamber.

10. A solar greenhouse as defined in claim 1, further including a base on which said chamber is mounted, and reservoir means for irrigation water contained within said base.

11. A solar greenhouse as defined in claim 10, wherein said battery means is mounted in said base.

12. A solar greenhouse as defined in claim 1, further including discharge light means for illuminating said lower portions of said chamber.

13. A solar greenhouse as defined in claim 1, wherein said wall means are prefabricated and wherein non-window portions thereof are thermally insulated.

14. A solar greenhouse as defined in claim 1, further including irrigating water distribution means supported from said rack means.

15. A solar greenhouse as defined in claim 1, wherein said rack means is structured to permit increasing vertical separation between trays supported therein on approach to the lower end of said racks.

16. A solar greenhouse as defined in claim 1, wherein ones of said windows are vertically openable to permit the passage of trays into and from said greenhouse.

17. A solar greenhouse as defined in claim 1, wherein the height ratio of said upper minor portion of said chamber to said lower major portion thereof is in the ratio of about 1:2.

* * * * *